United States Patent

Wiles

[11] Patent Number: 5,964,497
[45] Date of Patent: Oct. 12, 1999

[54] ADJUSTABLE ARMREST FOR INSTALLATION IN A VEHICLE

[76] Inventor: Devon E. Wiles, 2326 Glenwood Dr., Abilene, Tex. 79605

[21] Appl. No.: 09/231,375

[22] Filed: Jan. 14, 1999

[51] Int. Cl.⁶ ........................................................ B60J 9/00
[52] U.S. Cl. .............................................................. 296/153
[58] Field of Search ............................................... 296/153

[56] References Cited

U.S. PATENT DOCUMENTS

| | | | |
|---|---|---|---|
| 3,603,637 | 9/1971 | DePinto | 296/153 |
| 4,592,584 | 6/1986 | White | 296/153 |
| 4,619,478 | 10/1986 | Heimnick et al. | 296/153 |
| 4,659,135 | 4/1987 | Johnson | 296/153 |
| 5,320,401 | 6/1994 | Ott | 296/153 |
| 5,816,645 | 10/1998 | Grimes | 296/153 |

*Primary Examiner*—Gary C. Hoge

[57] ABSTRACT

A adjustable armrest for installation in a vehicle for supporting an arm while a person is seated in the vehicle. The adjustable armrest for installation in a vehicle includes a support base that is adapted for insertion between a door sill and a window pane of a door of a vehicle. An arm pad is coupled to the support base. A first end of a support arm is coupled to the support base. A second end of the support arm is adapted for abutting a door panel of the door of the vehicle.

18 Claims, 3 Drawing Sheets

ADJUSTABLE ARMREST FOR INSTALLATION IN A VEHICLE

BACKGROUND OF THE INVENTION

1. Field of the Invention

The present invention relates to armrests and more particularly pertains to a new adjustable armrest for installation in a vehicle for supporting an arm while a person is seated in the vehicle.

2. Description of the Prior Art

The use of armrests is known in the prior art. More specifically, armrests heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,794,671; U.S. Pat. No. 5,205,606; U.S. Pat. No. Des. 369,341; U.S. Pat. No. 4,226,464; U.S. Pat. No. 3,451,717; and U.S. Pat. No. 2,709,620.

While these devices fulfill their respective, particular objectives and requirements, the aforementioned patents do not disclose a new adjustable armrest for installation in a vehicle. The inventive device includes a support base that is adapted for insertion between a door sill and a window pane of a door of a vehicle. An arm pad is coupled to the support base. A first end of a support arm is coupled to the support base. A second end of the support arm is adapted for abutting a door panel of the door of the vehicle.

In these respects, the adjustable armrest for installation in a vehicle according to the present invention substantially departs from the conventional concepts and designs of the prior art, and in so doing provides an apparatus primarily developed for the purpose of supporting an arm while a person is seated in the vehicle.

SUMMARY OF THE INVENTION

In view of the foregoing disadvantages inherent in the known types of armrests now present in the prior art, the present invention provides a new adjustable armrest for installation in a vehicle construction wherein the same can be utilized for supporting an arm while a person is seated in the vehicle.

The general purpose of the present invention, which will be described subsequently in greater detail, is to provide a new adjustable armrest for installation in a vehicle apparatus and method which has many of the advantages of the armrests mentioned heretofore and many novel features that result in a new adjustable armrest for installation in a vehicle which is not anticipated, rendered obvious, suggested, or even implied by any of the prior art armrests, either alone or in any combination thereof.

To attain this, the present invention generally comprises a support base that is adapted for insertion between a door sill and a window pane of a door of a vehicle. An arm pad is coupled to the support base. A first end of a support arm is coupled to the support base. A second end of the support arm is adapted for abutting a door panel of the door of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable armrest for installation in a vehicle apparatus and method which has many of the advantages of the armrests mentioned heretofore and many novel features that result in a new adjustable armrest for installation in a vehicle which is not anticipated, rendered obvious, suggested, or even implied by any of the prior art armrests, either alone or in any combination thereof.

It is another object of the present invention to provide a new adjustable armrest for installation in a vehicle which may be easily and efficiently manufactured and marketed.

It is a further object of the present invention to provide a new adjustable armrest for installation in a vehicle which is of a durable and reliable construction.

An even further object of the present invention is to provide a new adjustable armrest for installation in a vehicle which is susceptible of a low cost of manufacture with regard to both materials and labor, and which accordingly is then susceptible of low prices of sale to the consuming public, thereby making such adjustable armrest for installation in a vehicle economically available to the buying public.

Still yet another object of the present invention is to provide a new adjustable armrest for installation in a vehicle which provides in the apparatuses and methods of the prior art some of the advantages thereof, while simultaneously overcoming some of the disadvantages normally associated therewith.

Still another object of the present invention is to provide a new adjustable armrest for installation in a vehicle for supporting an arm while a person is seated in the vehicle.

Yet another object of the present invention is to provide a new adjustable armrest for installation in a vehicle which includes a support base that is adapted for insertion between a door sill and a window pane of a door of a vehicle. An arm pad is coupled to the support base. A first end of a support arm is coupled to the support base. A second end of the support arm is adapted for abutting a door panel of the door of the vehicle.

Still yet another object of the present invention is to provide a new adjustable armrest for installation in a vehicle that helps reduce driver fatigue by supporting the driver's elbow.

Even still another object of the present invention is to provide a new adjustable armrest for installation in a vehicle that helps prevent a motorist from receiving black marks on skin or clothing caused by direct contact with the rubber seal at the window opening of the vehicle door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
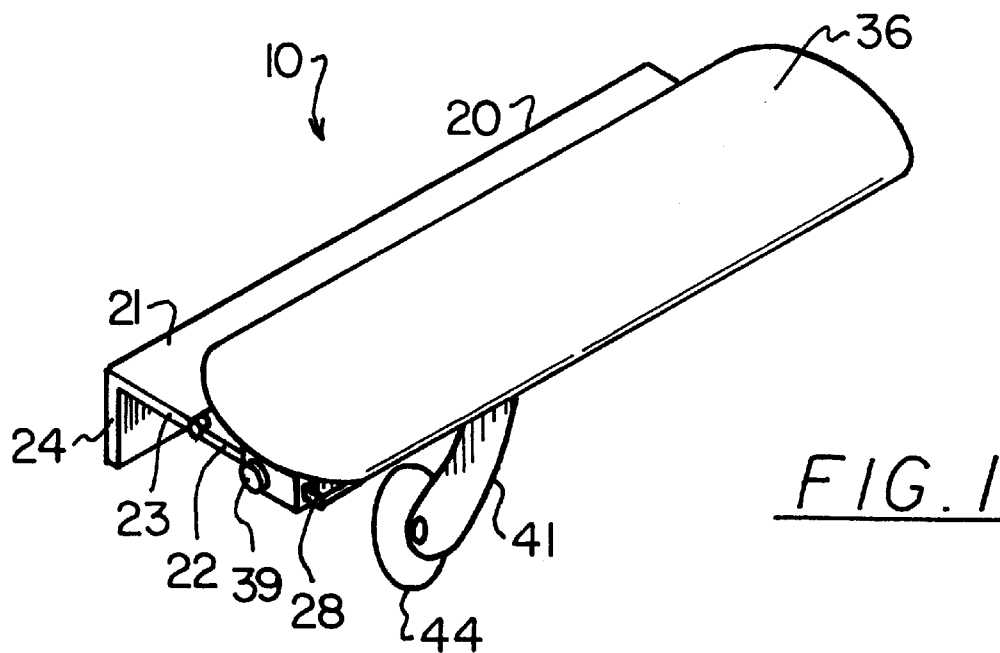
FIG. 1 is a schematic perspective view of a new adjustable armrest for installation in a vehicle according to the present invention.
Figure 2:
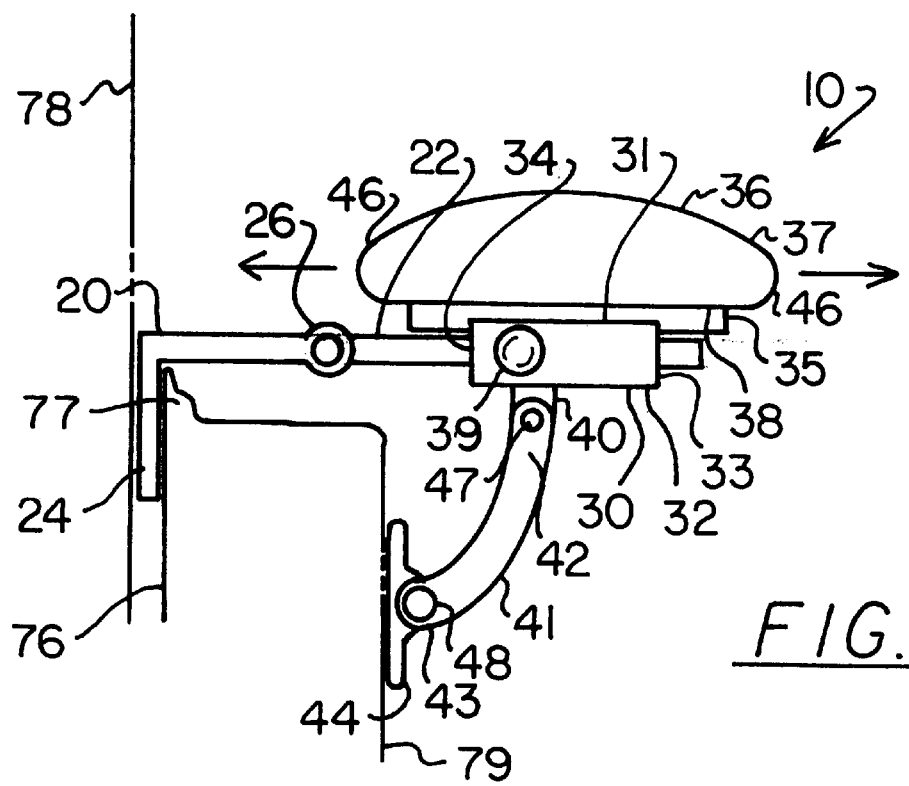
FIG. 2 is a schematic side view of the present invention.

With reference now to the drawings, and in particular to FIGS. 1 through 6 thereof, a new adjustable armrest for installation in a vehicle embodying the principles and concepts of the present invention and generally designated by the reference numeral 10 will be described.

As best illustrated in FIGS. 1 through 6, the adjustable armrest for installation in a vehicle 10 generally comprises a support base 20 that is adapted for insertion between a door sill 77 and a window pane 78 of a door 76 of a vehicle. An arm pad 36 is coupled to the support base 20. A first end 42 of the support arm 41 is coupled to the support base 20. A second end 43 of the support arm 41 is adapted for abutting a door panel 79 of the door 76 of the vehicle.

Preferably, the support base 20 has an angled first portion 21 and a generally planar second portion 22 that is pivotally coupled to the first portion 21 of the support base 20 such as by a hinge 26 that extends along the entire line of coupling. The first portion 21 of the support base 20 has a proximal portion 23 positioned adjacent the second portion 22 of the support base 20 and a distal portion 24 that is oriented substantially perpendicular to the proximal portion 23. The distal portion 24 is adapted for insertion between a door sill 77 and a window pane 78 of a door 76 of a vehicle.

Also preferably, a sliding portion 30 has opposite ends, top and bottom side 31,32, front and back sides 33,34, and an axis extending between the ends. The sliding portion 30 has a slot 28 extending through the front and back sides 33,34 of the sliding portion 30. The second portion 22 of the support base 20 slidably extends through the slot 28. Ideally, the slot 28 has a generally rectangular cross section taken perpendicular to the axis of the sliding portion 30.

Preferably, a generally rectangular pad base 35 is coupled to the top side 31 of the sliding portion 30. Ideally, the pad base 35 is rigid. The arm pad 36 is coupled to the pad base 35.

Also preferably, the arm pad 36 is deformable and has a generally planar lower surface 38 and an arcuate upper surface 37 so that the arm will rest flat on the arm pad 36 though the lower surface 38 of the arm pad 36 is positioned at an angle from the horizontal.

More preferably, one of the ends of the sliding portion 30 has a threaded aperture (not shown) therethrough adjacent the second portion 22 of the support base 20. An adjusting member 39 is threadedly received in the aperture for selectively preventing sliding of the sliding portion 30 with respect to the second portion 22 of the support base 20. The adjusting member 39 selectively abuts the second portion 22 of the support base 20. The adjusting member 39 is rotated to increase the pressure of the adjusting member 39 against the support base 20, thereby increasing the amount of friction between the support base 20 and the sliding portion 30 and adjusting member 39. To adjust the position of the arm pad 36, the adjusting member 39 is rotated in the opposite direction to relieve the pressure that the adjusting member 39 exerts against the support base 20.

Alternatively, the second portion 22 of the support base 20 has a plurality of bores 25 extending into a side edge thereof adjacent one of the ends of the sliding portion 30. One of the ends of the sliding portion 30 has an adjusting member 39 that slidably extends through it adjacent a line formed by the bores 25 of the second portion 22 of the support base 20. The adjusting member 39 is selectively insertable in the bores 25 of the side edges 46 of the second portion 22 of the support base 20 for preventing sliding of the sliding portion 30 with respect to the second portion 22 of the support base 20. Ideally, the sliding portion 30 is biased towards the support base 20.

Preferably, a holed flange 40 extends from the bottom side 32 of the sliding portion 30. The first end 42 of the support arm 41 is pivotally coupled to the holed flange 40 by a fastener such as a rivet 47. Ideally, the support arm 41 is curved along its longitudinal axis. Preferably, the support pad 44 is pivotally coupled to the second end 43 of the support arm 41 by a fastener such as a rivet 48 so that it lies flat against the door panel 79 no matter at what angle the arm pad 36 is positioned. Ideally, the support pad 44 has a frictional relationship with the door panel 79 sufficient to prevent sliding of the support pad 44 with respect to the door panel 79 when an arm is rested on the arm pad 36.

Figure 3:
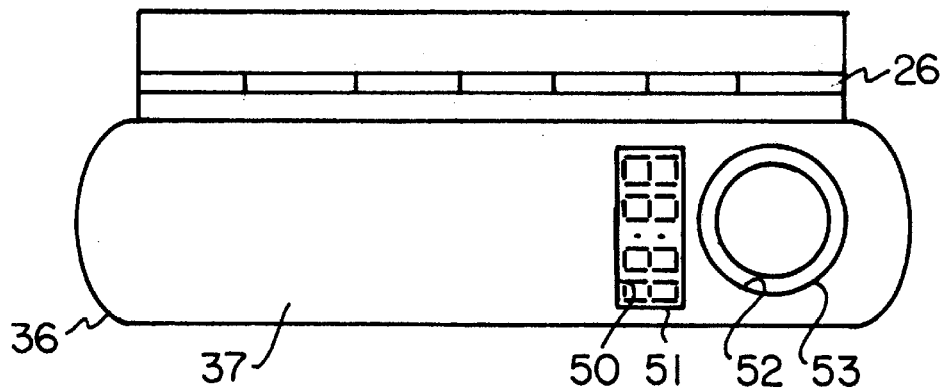
FIG. 3 is a schematic side view of the present invention.

Preferably, as shown in FIG. 3, the upper surface 37 of the arm pad 36 has a clock cavity 50 extending therein. A clock 51 is disposed in the clock cavity 50 of the arm pad 36. As also shown in FIG. 3, the upper surface 37 of the arm pad 36 has a container cavity 52 extending therein. A cup holder 53 is disposed in the container cavity 52 of the arm pad 36.

Figure 4:
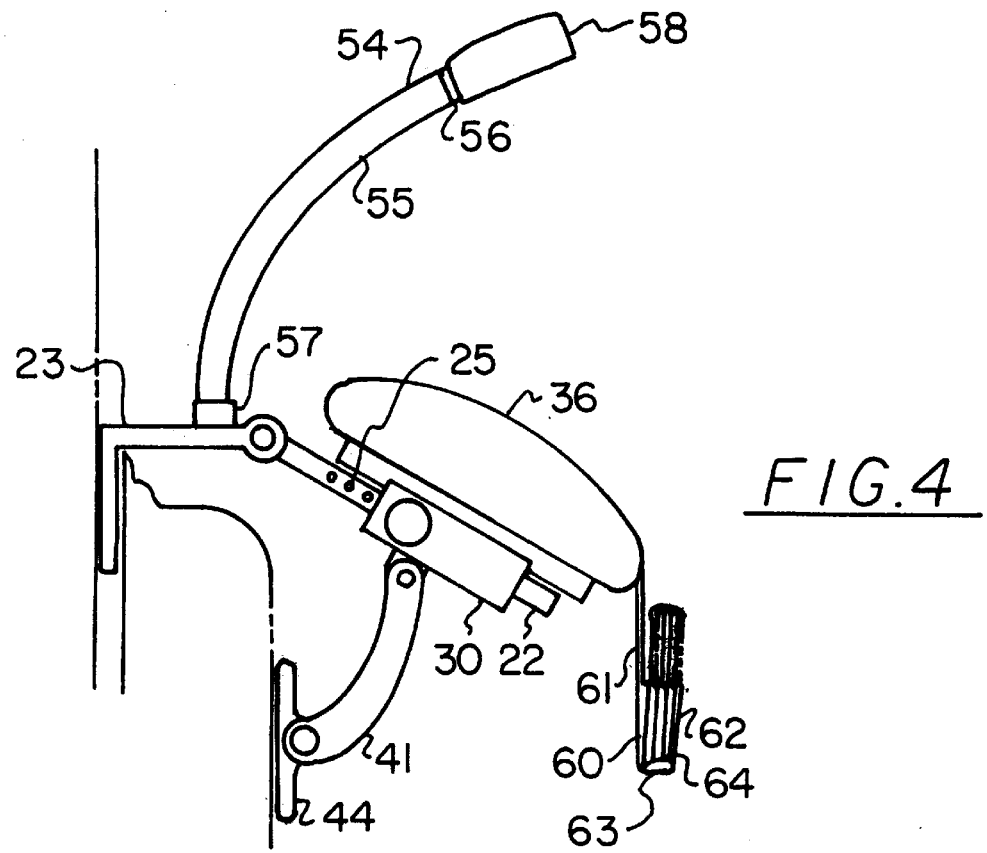
FIG. 4 is a schematic side view of the present invention.

Also preferably, as shown in FIG. 4, a reading light 54 has an elongate neck portion 55 with upper and lower ends 56,57, a cover 58 coupled to the upper end 56 of the neck portion 55 with a lower opening defining an opening into an interior of the cover 58, and a light bulb (not shown) coupled to the upper end 56 of the neck portion 55 and disposed in the cover 58. The lower end 57 of the neck portion 55 is coupled to the first portion 21 of the support base 20. Ideally, the neck portion 55 of the reading light 54 is deformable along its longitudinal axis.

Preferably, as also shown in FIG. 4, a pocket 60 for holding items has a back panel 61 that is coupled to the upper surface 37 of the arm pad 36, a front panel 62 that is spaced apart from the back panel 61, a bottom panel 63 that extends between the front and back panels 62,61, and a pair of side panels 64 that extend between the front and back panels 62,61. Each of the side panels 64 is pleated such that a width of each of the side panels 64 between the front and back panel 61s is adjustable so that the pocket 60 will expand when more objects are placed in it.

The arm pad 36 has opposite ends and opposite side edges 46 extending between the ends. A length of the arm pad 36 is defined between the ends thereof. The preferred length is between about 4 and 14 inches, ideally about 10 inches. A width of the arm pad 36 is defined between the side edges 46 thereof. The preferred width is between about 2 and 6 inches, ideally about 4 inches.

A length of the support arm 41 is defined between the first and second ends 42,43 thereof. The preferred length of the support arm 41 is between about 1 and 6 inches, ideally about 3 inches. Preferably, the support pad 44 is generally circular and has an outer diameter of between about 1 and 4 inches, ideally about 2 inches.

In use, the distal portion 24 of the first portion 21 of the support base 20 is inserted between the door sill 77 and window pane 78 of the door 76 of a vehicle. The sliding portion 30 is slid to a desired position and the adjusting member 39 is tightened or inserted in a bore 25 to hold the sliding portion 30 in the desired position. The angle of the arm pad 36 is adjusted by pivoting the second portion 22 of the support base 20 with respect to the first portion 21 of the support base 20. The support pad 44 is placed against the door panel 79 of the door 76. An arm of the user is placed on the upper surface 37 of the arm pad 36.

Figure 5:
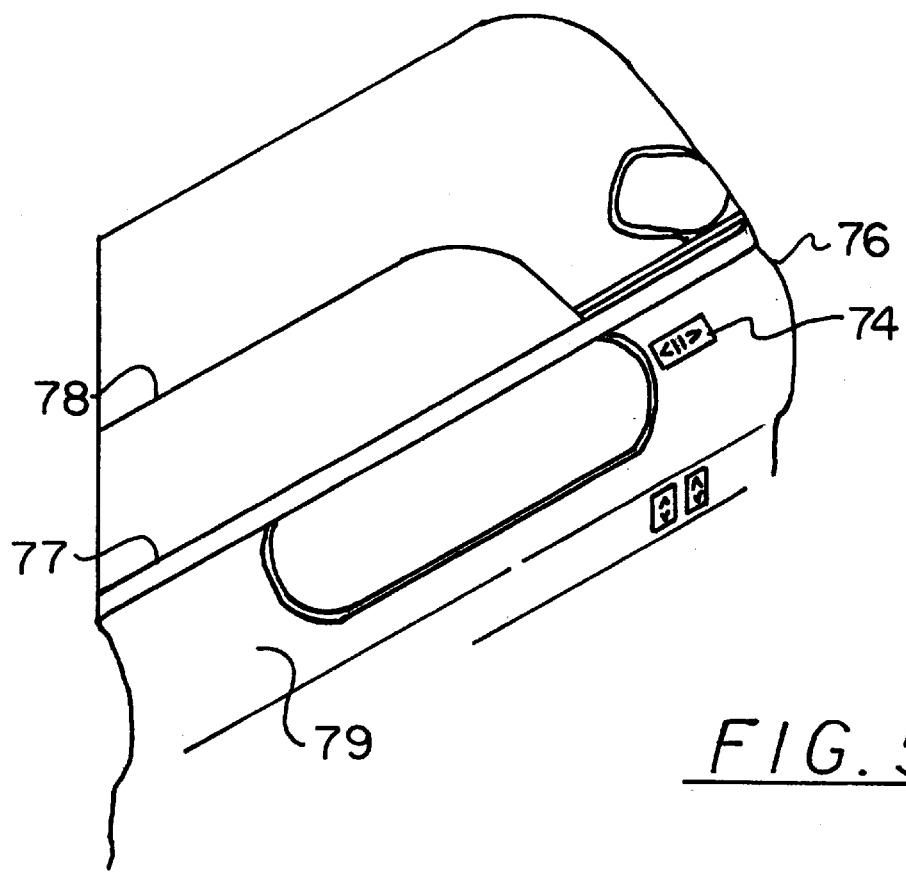
FIG. 5 is a schematic perspective view of an alternate embodiment of the present invention.
Figure 6:
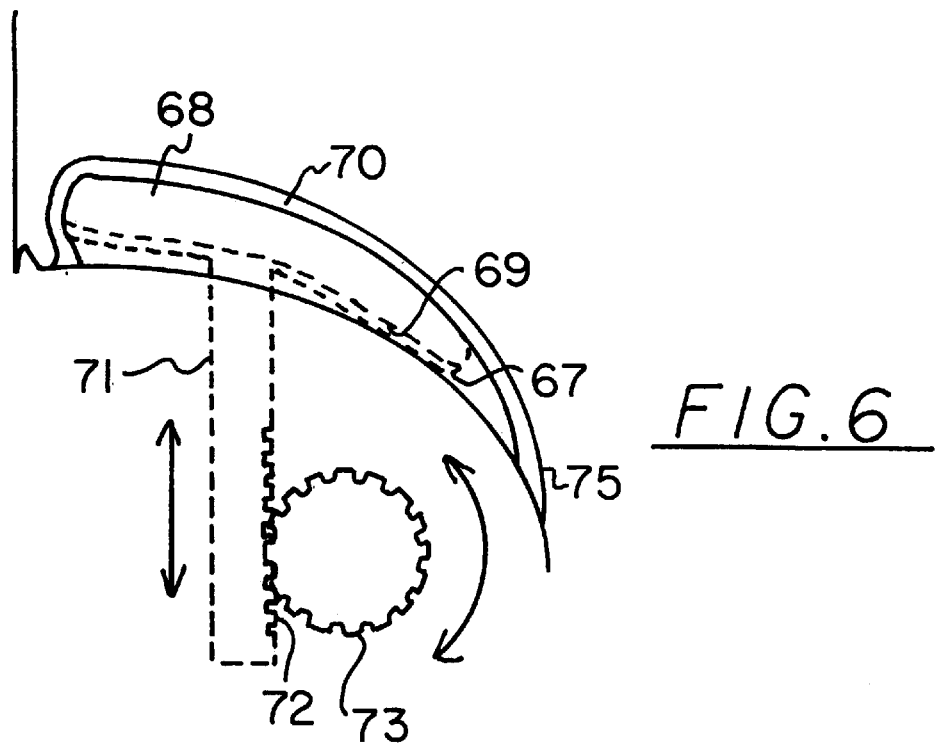
FIG. 6 is a schematic side view of an alternate embodiment of the present invention.

In an alternate embodiment, as illustrated in FIGS. 5 and 6, the armrest 10 comprises a rigid pad base 67. A deformable arm pad 68 is coupled to the pad base 67. The arm pad 68 has an arcuate lower surface 69 and an arcuate upper surface 70 so that a user's arm will rest flat on the arm pad 68 though the overall orientation of the arm pad 68 is positioned at an angle from the horizontal. A drive shaft 71 extends from the pad base 67 into an aperture in a door 76 of a vehicle. Preferably, the drive shaft 71 has a plurality of teeth 72 thereon towards a bottom end thereof.

A motor (not shown) selectively raises and lowers the arm pad. The motor is disposed in an interior of the door of the vehicle. Preferably, the motor has a toothed gear 73 operatively coupled to it. The toothed gear 73 engages the teeth 72 of the drive shaft 71. A controller 74 is mounted to the door panel 79 of the door 76 of the vehicle and is operatively coupled to the motor to permit selective raising and lowering of the arm pad. The controller 74 may have up and down buttons corresponding to that type of movement of the arm pad. Ideally, a flexible skin-like covering 75 is coupled to the outer surface of the door of the vehicle and extends over the upper surface 70 of the arm pad 68. The covering 75 keeps body parts out from under the arm pad to prevent pinching between the pad base and the door. Also, the covering keeps dirt off of the gear 73 and drive shaft 71.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An armrest, comprising:

a support base being adapted for insertion between a door sill and a window pane of a door of a vehicle;

an arm pad being coupled to said support base;

a support arm having opposite first and second ends and a longitudinal axis extending between said ends, said first end of said support arm being coupled to said support base, said second end being adapted for abutting a door panel of said door of said vehicle;

wherein said support base has an angled first portion and a second portion pivotally coupled to said first portion of said support base.

2. The armrest of claim 1, wherein said first end of said support arm is pivotally coupled to said support base.

3. The armrest of claim 1, further comprising a sliding portion having opposite ends, top and bottom sides, front and back sides, and an axis extending between said ends, sliding portion having a slot extending through said front and back sides thereof, said support base slidably extending through said slot, said arm pad being coupled to said top side of said sliding portion.

4. The armrest of claim 3, further comprising a rigid pad base coupled to said top side of said sliding portion, said arm pad being coupled to said pad base.

5. The armrest of claim 1, wherein, said arm pad has a generally planar lower surface and an arcuate upper surface.

6. The armrest of claim 3, wherein one of said ends of said sliding portion has a threaded aperture therethrough adjacent said second portion of said support base, an adjusting member being threadedly received in said aperture for selectively preventing sliding of said sliding portion with respect to said support base, said adjusting member selectively abutting said support base.

7. The armrest of claim 3, wherein said second portion of said support base has a plurality of bores extending into a side edge thereof adjacent one of said ends of said sliding portion, one of said ends of said sliding portion having an adjusting member slidably extending therethrough adjacent a line formed by said bores of said second portion of said support base, said adjusting member being selectively insertable in said bores of said side edges of said second portion of said support base for preventing sliding of said sliding portion with respect to said support base, said sliding portion being biased towards said support base.

8. The armrest of claim 1, wherein said support pad is pivotally coupled to said second end of said support arm.

9. The armrest of claim 1, wherein said support pad has a frictional relationship with said door panel sufficient to prevent sliding of said support pad with respect to said door panel when an arm is rested on said arm pad.

10. The armrest of claim 1, wherein an upper surface of said arm pad has a clock cavity extending therein, a clock being disposed in said clock cavity of said arm pad.

11. The armrest of claim 1, wherein an upper surface of said arm pad has a container cavity extending therein, a cup holder being disposed in said container cavity of said arm pad.

12. The armrest of claim 1, further comprising a reading light having an elongate neck portion having upper and lower ends, a cover coupled to said upper end of said neck portion and having a lower opening defining an opening into an interior of said cover, and a light bulb coupled to said upper end of said neck portion and disposed in said cover, said lower end of said neck portion being coupled to said first portion of said support base.

13. The armrest of claim 12, wherein said neck portion of said reading light is deformable.

14. The armrest of claim 1, further comprising a pocket having a back panel being coupled to said upper surface of said arm pad, a front panel spaced apart from said back panel, a bottom panel extending between said front and back panels, and a pair of side panels extending between said front and back panels.

15. The armrest of claim 14, wherein each of said side panels is pleated such that a width of each of said side panels between said front and back panels is adjustable.

16. An armrest comprising, in combination:

a support base having an angled first portion and a generally planar second portion pivotally coupled to said first portion of said support base;

said first portion of said support base having a proximal portion positioned adjacent said second portion of said support base and a distal portion being oriented substantially perpendicular to said proximal portion, said distal portion being adapted for insertion between a door sill and a window pane of a door of a vehicle;

a sliding portion having opposite ends, top and bottom sides, front and back sides, and an axis extending between said ends;

said sliding portion having a slot extending through said front and back sides thereof, said second portion of said support base slidably extending through said slot, said slot having a generally rectangular cross section taken perpendicular to said axis of said sliding portion;

a generally rectangular pad base coupled to said top side of said sliding portion;

a deformable arm pad being coupled to said pad base, said arm pad having a generally planar lower surface and an arcuate upper surface;

one of said ends of said sliding portion having a threaded aperture therethrough adjacent said second portion of said support base, an adjusting member being threadedly received in said aperture for selectively preventing sliding of said sliding portion with respect to said second portion of said support base, said adjusting member selectively abutting said second portion of said support base;

a holed flange extending from said bottom side of said sliding portion;

a support arm having opposite first and second ends and a longitudinal axis extending between said ends, said first end of said support arm being pivotally coupled to said holed flange, said support arm being curved along said longitudinal axis thereof;

a support pad being pivotally coupled to said second end of said support arm, said support pad being adapted for abutting a door panel of said door of said vehicle, said support pad having a frictional relationship with said door panel sufficient to prevent sliding of said support pad with respect to said door panel when an arm is rested on said arm pad;

said upper surface of said arm pad having a clock cavity extending therein, a clock being disposed in said clock cavity of said arm pad;

said upper surface of said arm pad having a container cavity extending therein, a cup holder being disposed in said container cavity of said arm pad;

a reading light having an elongate neck portion having upper and lower ends, a cover coupled to said upper end of said neck portion and having a lower opening defining an opening into an interior of said cover, and a light bulb coupled to said upper end of said neck portion and disposed in said cover, said lower end of said neck portion being coupled to said first portion of said support base;

said neck portion of said reading light being deformable;

a pocket having a back panel being coupled to said upper surface of said arm pad, a front panel spaced apart from said back panel, a bottom panel extending between said front and back panels, and a pair of side panels extending between said front and back panels, each of said side panels being pleated such that a width of each of said side panels between said front and back panels is adjustable;

said arm pad having opposite ends and opposite side edges extending between said ends, wherein a length of said arm pad is defined between said ends thereof, said length being between about 4 and 14 inches;

wherein a width of said arm pad is defined between said side edges thereof, said width being between about 2 and 6 inches;

wherein a length of said support arm is defined between said first and second ends thereof, said length of said support arm being between about 1 and 6 inches; and said support pad being generally circular, wherein an outer diameter of said support pad is between about 1 and 4 inches.

17. An armrest, comprising:

a pad base;

a deformable arm pad being coupled to said pad base, said arm pad having an arcuate lower surface and an arcuate upper surface;

a drive shaft extending from said pad base into an aperture in a door of a vehicle;

a motor for selectively raising and lowering said arm pad, said motor being operatively coupled to said drive shaft;

a controller being operatively coupled to said motor; and a flexible covering being coupled to said outer surface of said door of said vehicle and extending over said upper surface of said arm pad.

18. The armrest of claim 17, wherein said drive shaft has a plurality of teeth thereon towards a bottom end thereof, said motor having a toothed gear operatively coupled thereto, said toothed gear engaging said teeth of said drive shaft.

* * * * *